US010995226B2

United States Patent
Iio et al.

(10) Patent No.: US 10,995,226 B2
(45) Date of Patent: May 4, 2021

(54) ACTIVE-ENERGY-RAY-CURABLE COMPOSITION, ACTIVE-ENERGY-RAY-CURABLE INK COMPOSITION, COMPOSITION STORED CONTAINER, TWO-DIMENSIONAL OR THREE-DIMENSIONAL IMAGE FORMING APPARATUS, METHOD FOR FORMING TWO-DIMENSIONAL OR THREE-DIMENSIONAL IMAGE, CURED PRODUCT, AND LAMINATED CURED PRODUCT

(71) Applicants: Masato Iio, Kanagawa (JP); Takao Hiraoka, Kanagawa (JP)

(72) Inventors: Masato Iio, Kanagawa (JP); Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 429 days.

(21) Appl. No.: 15/184,477

(22) Filed: Jun. 16, 2016

(65) Prior Publication Data
US 2016/0369116 A1 Dec. 22, 2016

(30) Foreign Application Priority Data

Jun. 22, 2015 (JP) .............. JP2015-124649
Mar. 17, 2016 (JP) .............. JP2016-054411

(51) Int. Cl.
C09D 11/101 (2014.01)
C09D 4/06 (2006.01)
(Continued)

(52) U.S. Cl.
CPC .......... *C09D 11/101* (2013.01); *B29C 64/135* (2017.08); *B33Y 10/00* (2014.12);
(Continued)

(58) Field of Classification Search
CPC .......... C09D 11/30; C09D 4/06; C09D 11/10; C09D 11/101; B29C 64/135; B33Y 10/00;
(Continued)

(56) References Cited

U.S. PATENT DOCUMENTS 8,632,174 B2 1/2014 Noguchi et al.
8,727,522 B2 5/2014 Maekawa et al.
(Continued)

FOREIGN PATENT DOCUMENTS

JP 58-71966 A 4/1983
JP 58-145712 A 8/1983
(Continued)

OTHER PUBLICATIONS

U.S Appl. No. 14/837,423, filed Aug. 27, 2015.
(Continued)

*Primary Examiner* — Lucas A Stelling
*Assistant Examiner* — Sathavaram I Reddy
(74) *Attorney, Agent, or Firm* — Oblon, McClelland, Maier & Neustadt, L.L.P.

(57) ABSTRACT

An active-energy-ray-curable composition including at least one monofunctional (meth)acrylate, at least one multifunctional (meth)acrylate, and at least one chlorinated-olefin-structure-containing polymer.

21 Claims, 3 Drawing Sheets

(51) Int. Cl.

| | | |
|---|---|---|
| *C09D 11/30* | (2014.01) | |
| *B33Y 10/00* | (2015.01) | |
| *B33Y 70/00* | (2020.01) | |
| *B33Y 80/00* | (2015.01) | |
| *B41J 2/475* | (2006.01) | |
| *C09D 11/10* | (2014.01) | |
| *C08F 220/18* | (2006.01) | |
| *C08F 2/48* | (2006.01) | |
| *B29C 64/135* | (2017.01) | |

(52) U.S. Cl.
CPC ............... *B33Y 70/00* (2014.12); *B33Y 80/00* (2014.12); *B41J 2/475* (2013.01); *C08F 2/48* (2013.01); *C08F 220/18* (2013.01); *C09D 4/06* (2013.01); *C09D 11/10* (2013.01); *C09D 11/30* (2013.01)

(58) Field of Classification Search
CPC .......... B33Y 70/00; B33Y 80/00; B41J 2/475; C08F 2/48; C08F 220/18
See application file for complete search history.

(56) References Cited

U.S. PATENT DOCUMENTS

| | | | |
|---|---|---|---|
| 8,815,140 B2 | 8/2014 | Aruga et al. | |
| 8,926,082 B2 | 1/2015 | Hiraoka | |
| 8,926,083 B2 | 1/2015 | Hiraoka | |
| 8,926,084 B2 | 1/2015 | Hiraoka | |
| 9,068,094 B2 | 6/2015 | Hiraoka | |
| 9,120,946 B2 | 9/2015 | Seno et al. | |
| 2004/0145639 A1 | 7/2004 | Noutary | |
| 2005/0019533 A1* | 1/2005 | Mossbrook | B41M 7/0045 428/204 |
| 2005/0271882 A1* | 12/2005 | Walther | C08F 255/02 428/423.1 |
| 2008/0316244 A1* | 12/2008 | Lugassi | C09D 11/101 347/16 |
| 2010/0227970 A1* | 9/2010 | Nishioka | C09J 123/28 524/570 |
| 2012/0147103 A1 | 6/2012 | Hasegawa et al. | |
| 2012/0200648 A1 | 8/2012 | Hiraoka et al. | |
| 2012/0242768 A1 | 9/2012 | Seno et al. | |
| 2013/0321539 A1 | 12/2013 | Hiraoka | |
| 2014/0240414 A1 | 8/2014 | Hiraoka | |
| 2014/0327719 A1 | 11/2014 | Hiraoka | |
| 2014/0336298 A1 | 11/2014 | Hiraoka | |
| 2014/0338562 A1 | 11/2014 | Hiraoka | |
| 2015/0009265 A1 | 1/2015 | Kohzuki et al. | |
| 2015/0042731 A1 | 2/2015 | Hiraoka | |
| 2015/0077481 A1 | 3/2015 | Yoshino et al. | |
| 2015/0099819 A1 | 4/2015 | Hiraoka | |
| 2015/0126636 A1 | 5/2015 | Hiraoka | |
| 2015/0130878 A1 | 5/2015 | Kohzuki et al. | |
| 2015/0232675 A1 | 8/2015 | Yoshino et al. | |
| 2015/0232676 A1 | 8/2015 | Hiraoka | |
| 2015/0232677 A1 | 8/2015 | Hiraoka | |
| 2015/0329729 A1 | 11/2015 | Hiraoka | |
| 2016/0009931 A1 | 1/2016 | Kohzuki et al. | |
| 2016/0075895 A1 | 3/2016 | Kohzuki et al. | |

FOREIGN PATENT DOCUMENTS

| | | |
|---|---|---|
| JP | 58-162640 A | 9/1983 |
| JP | 07-010894 | 2/1995 |
| JP | 10-306259 | 11/1998 |
| JP | 2002-348498 A | 12/2002 |
| JP | 2003-015526 | 1/2003 |
| JP | 2004-526820 | 9/2004 |
| JP | 2005-139305 A | 6/2005 |
| JP | 2005-263848 A | 9/2005 |
| JP | 2007-532755 A | 11/2007 |
| JP | 2009-191097 A | 8/2009 |
| JP | 2010-006879 A | 1/2010 |
| JP | 2010-530922 A | 9/2010 |
| JP | 2012-251123 | 12/2012 |
| JP | 2012-255137 A | 12/2012 |
| JP | 2013-249357 | 12/2013 |
| JP | 2015-180539 | 10/2015 |
| JP | 2016-011416 | 1/2016 |
| JP | 2010-006878 A | 1/2020 |
| WO | WO 2015/186340 A1 | 12/2015 |

OTHER PUBLICATIONS

Information Offer issued Aug. 6, 2019 in corresponding Japanese Patent Application No. 2016-054411 (with English Translation), 4 pages.
Japanese Office Action dated Jan. 28, 2020, in Japanese Patent Application No. 2016-054411 (with English Translation).
Japanese Office Action dated Aug. 25, 2020 in Patent Application No. 2016-054411, 4 pages.

* cited by examiner

ACTIVE-ENERGY-RAY-CURABLE COMPOSITION, ACTIVE-ENERGY-RAY-CURABLE INK COMPOSITION, COMPOSITION STORED CONTAINER, TWO-DIMENSIONAL OR THREE-DIMENSIONAL IMAGE FORMING APPARATUS, METHOD FOR FORMING TWO-DIMENSIONAL OR THREE-DIMENSIONAL IMAGE, CURED PRODUCT, AND LAMINATED CURED PRODUCT

CROSS-REFERENCE TO RELATED APPLICATIONS

The present application claims priority under 35 U.S.C. § 119 to Japanese Patent Application No. 2015-124649, filed Jun. 22, 2015 and Japanese Patent Application No. 2016-054411, filed Mar. 17, 2016. The contents of which are incorporated herein by reference in their entirety.

BACKGROUND OF THE INVENTION

Field of the Invention

The present disclosure relates to active-energy-ray-curable compositions, active-energy-ray-curable ink compositions, composition stored containers, two-dimensional or three-dimensional image forming apparatuses, methods for forming two-dimensional or three-dimensional images, cured products, and laminated cured products.

Description of the Related Art

Photopolymerizable inkjet inks containing (meth)acrylic acid esters are widely known (see Japanese Translation of PCT International Application Publication No. JP-T-2004-526820). In addition, it is also known that photopolymerizable inks containing polymer components can impart various functions to coating films (see Japanese Examined Patent Publication No. 07-10894).

One advantage of incorporating polymer components is that sufficient close adhesiveness can be ensured to, for example, substrates containing plastic materials, the substrates being difficult for liquid to permeate, relatively having a smooth surface, and difficultly retaining close adhesiveness to coating films. However, in cases where a photopolymerizable inkjet ink contains polymer components, viscosity of the ink considerably becomes high due to the polymer components contained in the ink. Therefore, if monomer materials to be used as base materials in the photopolymerizable inkjet ink do not have low viscosity, it is difficult to lower viscosity of the photopolymerizable inkjet ink containing polymer components in such a range that the ink can be ejected. The substrates having poor adhesiveness (e.g., polypropylene) are generally subjected to surface treatment such as the corona discharge surface treatment. However, these surface treatments may be difficult to conduct under the restricted conditions of devices and workplaces. Therefore, it is desired to ensure close adhesiveness to substrates having poor adhesiveness (e.g., polypropylene) that are not surface-treated.

SUMMARY OF THE INVENTION

An active-energy-ray-curable composition of the present disclosure contains at least one monofunctional (meth)acrylate, at least one multifunctional (meth)acrylate, and at least one chlorinated-olefin-structure-containing polymer.

DESCRIPTION OF THE EMBODIMENTS

Active-Energy-Ray-Curable Composition

Figure 1:
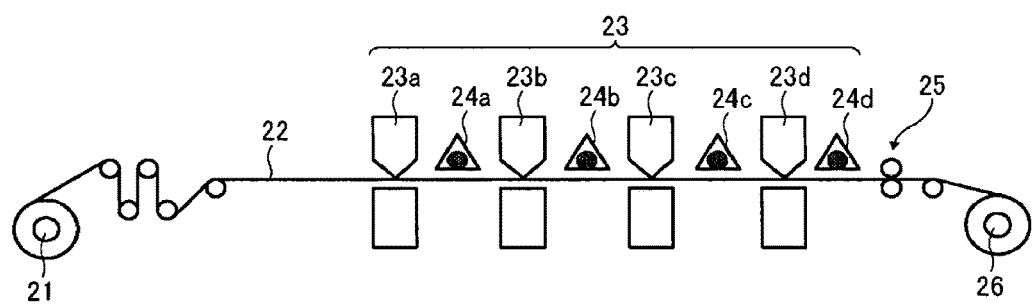
FIG. 1 is a schematic view of an example of an image forming apparatus of the present disclosure.

An active-energy-ray-curable composition of the present disclosure contains at least one monofunctional (meth)acrylate, at least one multifunctional (meth)acrylate, and at least one chlorinated-olefin-structure-containing polymer, and further contains other components if necessary.

The present disclosure is based on the following findings. Specifically, as the typical techniques, inkjet inks containing polymer components are disclosed. However, it is not described that whether the inkjet inks containing polymer components adhere to polypropyrene substrates. So far, there have not been active-energy-ray-curable inkjet inks having close adhesiveness to polypropyrene substrates that are not surface-treated.

The present disclosure has an object to provide an active-energy-ray-curable composition that is low in viscosity and is excellent in inkjet ejectability and close adhesiveness to plastic materials.

According to the present disclosure, an active-energy-ray-curable composition that is low in viscosity and is excellent in inkjet ejectability and close adhesiveness to plastic materials can be provided.

The present disclosure provides a further improved technique of the technique that the chlorinated-olefin-structure-containing polymer is used in order to improve the ink in close adhesiveness to a substrate. The monofunctional (meth)acrylate excellent in solubility generally has a small molecular weight and high volatility, and is problematic in skin sensitization. In addition, the monofunctional (meth)acrylate cannot impart sufficient strength to a film to be coated. However, the monofunctional (meth)acrylate of the present disclosure is a monomer that is excellent in ability to dissolve the chlorinated-olefin-structure-containing polymer.

The multifunctional (meth)acrylate generally has less volatility, and considerably contributes to achievement of good close adhesiveness. Meanwhile, the multifunctional (meth)acrylate is a large molecule, and has considerably high viscosity. In addition, the multifunctional (meth)acrylate containing polar groups at a high ratio, and hardly becomes a good solvent for non-polar chlorinated-olefin-structure-containing polymers. However, the present disclosure can provide an active-energy-ray-curable composition that can overcome the above problems.

It is preferable that the monofunctional (meth)acrylate and the multifunctional (meth)acrylate in the active-energy-ray-curable composition be negative in skin sensitization.

Here, a monomer negative in skin sensitization means a compound satisfying at least one of the following (1) to (3). (1) A compound having a Stimulation Index of less than 3, where the Stimulation Index indicates a degree of skin sensitization as measured by a skin sensitization test according to the LLNA (Local Lymph Node Assay) method. (2) A compound evaluated as "compound negative in skin sensitization" or "compound having no skin sensitization" by the MSDS (Material Safety Data Sheet). (3) It is judged that the compound (1) evaluated as "compound negative in skin sensitization" or "compound having no skin sensitization" in the reference (e.g., Contact Dermatitis 8, 223-235 (1982)) is negative in skin sensitization when the SI value of the compound is less than 3, as described in journal of "*Function and Materials*", September, 2005, volume 25, No. 9, Page 55.

The lower the SI value is, the lower skin sensitization is. Therefore, a monomer having low SI value is preferably used in the present disclosure. The SI value of the monomer is preferably less than 3, more preferably 2 or less, still more preferably 1.6 or less.

<Monofunctional (Meth)Acrylate>

The monofunctional (meth)acrylate is a compound containing one methacryloyl group or acryloyl group in a molecule of the monofunctional (meth)acrylate.

In the present disclosure, the monofunctional (meth)acrylate negative in skin sensitization is preferably used.

The monofunctional (meth)acrylate negative in skin sensitization means that the SI value of the monofunctional (meth)acrylate is less than 3.

Examples of the monofunctional (meth)acrylate negative in skin sensitization include t-butyl methacrylate, n-pentyl methacrylate, and n-hexyl methacrylate.

A SI value of the monofunctional (meth)acrylate is preferably less than 3.

An amount of the monofunctional (meth)acrylate is 50 parts by mass or more but 85 parts by mass or less relative to 100 parts by mass of total monomer components.

<Multifunctional (Meth)Acrylate>

The multifunctional (meth)acrylate is a compound containing 2 or more methacryloyl groups or acryloyl groups (preferably 2 through 4 methacryloyl groups or acryloyl groups) in a molecule of the multifunctional (meth)acrylate.

In the present disclosure, the multifunctional (meth)acrylate negative in skin sensitization is used.

Here, the multifunctional (meth)acrylate negative in skin sensitization means that the SI value of the multifunctional (meth)acrylate is less than 3.

The multifunctional (meth)acrylate negative in skin sensitization can contain at least one selected from the group consisting of glycerol dimethacrylate, ethyleneoxide-modified trimethylolpropane trimethacrylate, caprolactone-modified dipentaerythritolhexaacrylate, and tricyclodecane dimethanol diacrylate.

An amount of the multifunctional (meth)acrylate is 15 parts by mass or more but 50 parts by mass or less relative to 100 parts by mass of total monomer components.

<Chlorinated-Olefin-Structure-Containing Polymer>

When the active-energy-ray-curable composition contains the chlorinated-olefin-structure-containing polymer, the resultant ink is excellent in curing ability and close adhesiveness to a polypropyrene substrate that is not surface-treated.

The chlorinated-olefin-structure-containing polymer can be obtained by chlorinating a polyolefin resin.

The polyolefin resin is not particularly limited and may be appropriately selected depending on the intended purpose. Examples of the polyolefin resin include polyethylene, polypropylene, propylene-α-olefin copolymer products, and ethylene-vinyl acetate copolymer products.

A rate of chlorination of the chlorinated-olefin-structure-containing polymer is 10% by mass or more but 50% by mass or less.

The rate of chlorination is determined by dividing a molecular weight of a polymer by the total atomic weight of chlorine in the polymer, and can be determined by the typical element analyzing methods.

The chlorinated-olefin-structure-containing polymer needs to have excellent ability to dissolve the aforementioned monomer components. Therefore, the chlorinated-olefin-structure-containing polymer having a cross-linked structure is not suitable. It is preferable that the chlorinated-olefin-structure-containing polymer be a chain structure or a branched chain structure. The chlorinated-olefin-structure-containing polymer having excessively high weight average molecular weight is considerably poor in ability to be dissolved in the ink, even if it is a chain structure or a branched chain structure, which is not preferable. Therefore, a weight average molecular weight of the chlorinated-olefin-structure-containing polymer is preferably 300,000 or less, more preferably 100,000 or less.

Here, the weight average molecular weight of the chlorinated-olefin-structure-containing polymer is a weight average molecular weight determined according to the standard polystyrene molecular weight conversion, and is measured by using the following: a high-speed liquid chromatography apparatus ("WATERS 2695" (main body), available from Waters) with a detector ("WATERS 2414", available from Waters); and a column (SHODEX GPC KF-806L (molecular cut-off: $2\times10^7$, separation range: 100 through $2\times10^7$, theoretical plate: 10,000 steps/column, filler material: styrene divinylbenzene copolymer, particle diameter of the filler: 10 μm) so that the three columns are arranged in series.

An amount of the chlorinated-olefin-structure-containing polymer is preferably 0.05 parts by mass or more but 10 parts by mass or less, more preferably 0.1 parts by mass or more but 5 parts by mass or less, relative to 100 parts by mass of the total monomer components.

The chlorinated-olefin-structure-containing polymer is precipitated when the ink is added dropwise to a solvent such as methanol, and can be isolated by filtrating the ink dissolved in the solvent. Gas obtained by burning the thus-obtained precipitate is subjected to element analysis (e.g., ion chromatography), and presence of the chlorinated-olefin-structure-containing polymer can be confirmed as a chlorine atom. The other components can be confirmed for whether the other components are identical to the intended other components by gas chromatography mass spectrometry.

As described above, the viscosity at 25° C. of t-butyl methacrylate, n-pentyl methacrylate, or n-hexyl methacrylate as the monofunctional (meth)acrylate is low; i.e., within a range of from about 1 mPa·s through about 2 mPa·s. These are important components for lowering the viscosity of the ink containing the active-energy-ray-curable composition in such a range that the ink can be ejected without causing problems in skin sensitization. However, the monofunctional (meth)acrylate alone cannot impart curing ability to the composition. Therefore, the composition contains at least one selected from the group consisting of glycerol dimethacrylate, ethyleneoxide-modified trimethylolpropane trimethacrylate, caprolactone-modified dipentaerythritol-hexaacrylate, and tricyclodecane dimethanol diacrylate, and the resultant ink can have practical curing ability. Furthermore, the composition contains the chlorinated-olefin-structure-containing polymer in order to improve the ink in close adhesiveness to the plastic substrates without inhibiting properties of the ink.

Here, the monofunctional (meth)acrylate is defined as compound (A); the multifunctional (meth)acrylate is defined as compound (B); 1-hydroxy-cyclohexyl phenyl ketone, 2-dimethylamino-2-(4-methylbenzyl)-1-(4-morpholin-4-yl-phenyl)butan-1-one, and an equimolar mixture of 2,4-diethylthioxanthone and p-dimethylaminobenzoic acid-2-ethylhexyl, which are negative in skin sensitization and are inexpensive and easily available polymerization initiators, are defined as compound (C); and the chlorinated-olefin-structure-containing polymer is defined as compound (D). It is preferable that an amount of the compound (A) be 50 parts by mass or more but 85 parts by mass or less, an amount of the compound (B) be 15 parts by mass or more but 50 parts by mass or less, and an amount of the compound (C) be 5 parts by mass or more but 15 parts by mass or less, relative to 100 parts by mass of the total monomer components.

Moreover, an amount of the compound (D) is preferably 0.05 parts by mass or more but 10 parts by mass or less.

The active-energy-ray-curable composition of the present disclosure contains the compound negative in skin sensitization, and if necessary, may contain a compound that is slightly problematic in skin sensitization, or a compound of which skin sensitization is unknown. For example, (meth)acrylate, (meth)acrylamide, and vinyl ether can be used in combination. Specific examples of the compound include ethylene glycol di(meth)acrylate, hydroxypivalic acid neopentyl glycol di(meth)acrylate, γ-butyrolactoneacrylate, isobornyl(meth)acrylate, formalized trimethylolpropane mono(meth)acrylate, polytetramethylene glycol di(meth)acrylate, trimethylolpropane (meth)acrylic acid benzoic acid ester, diethylene glycol di(meth)acrylate, triethylene glycol di(meth)acrylate, tetraethylene glycol di(meth)acrylate, polyethylene glycol di(meth)acrylate [$CH_2$=CH—CO—$(OC_2H_4)_n$—OCOCH=$CH_2$ (n is nearly equal to 9), $CH_2$=CH—CO—$(OC_2H_4)_n$—OCOCH=$CH_2$ (n is nearly equal to 14), $CH_2$=CH—CO—$(OC_2H_4)_n$—OCOCH=$CH_2$ (n is nearly equal to 23)], dipropylene glycol di(meth)acrylate, tripropylene glycol di(meth)acrylate, polypropylene glycol di(meth)acrylate [$CH_2$=$C(CH_3)$—CO—$(OC_3H_6)_n$—OCOC($CH_3$)=$CH_2$ (n is nearly equal to 7)], 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, tricyclodecane dimethanol di(meth)acrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl (meth)acrylamide, propylene oxide-modified tetramethylolmethane tetra(meth)acrylate, dipentaerythritol hydroxypenta(meth)acrylate, caprolactone-modified dipentaerythritol hydroxypenta(meth)acrylate, ditrimethylolpropane tetra(meth)acrylate, pentaerythritol tetra(meth)acrylate, trimethylolpropane tri(meth)acrylate, ethyleneoxide-modified trimethylolpropane tri(meth)acrylate, propylene oxide-modified trimethylolpropane tri(meth)acrylate, caprolactone-modified trimethylolpropane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinylcaprolactam, N-vinylpyrrolidone, N-vinylformamide, polyurethane di(meth)acrylate, polyurethane tri(meth)acrylate, polyurethane tetra(meth)acrylate, polyurethane penta(meth)acrylate, polyurethane poly(meth)acrylate, triethylene glycol divinyl ether, cyclohexanedimethanol divinyl ether, cyclohexanedimethanol monovinyl ether, hydroxyethylvinyl ether, diethylene glycol monovinyl ether, diethylene glycol divinyl ether, dicyclopentadiene vinyl ether, tricyclodecane vinyl ether, benzilvinyl ether, ethyloxetane methyl vinyl ether, triethylene glycol divinyl ether, hydroxybutyl vinyl ether, and ethyl vinyl ether. These may be used alone or in combination thereof.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, various optical materials, and building materials such as walls and floors.

Figure 2:
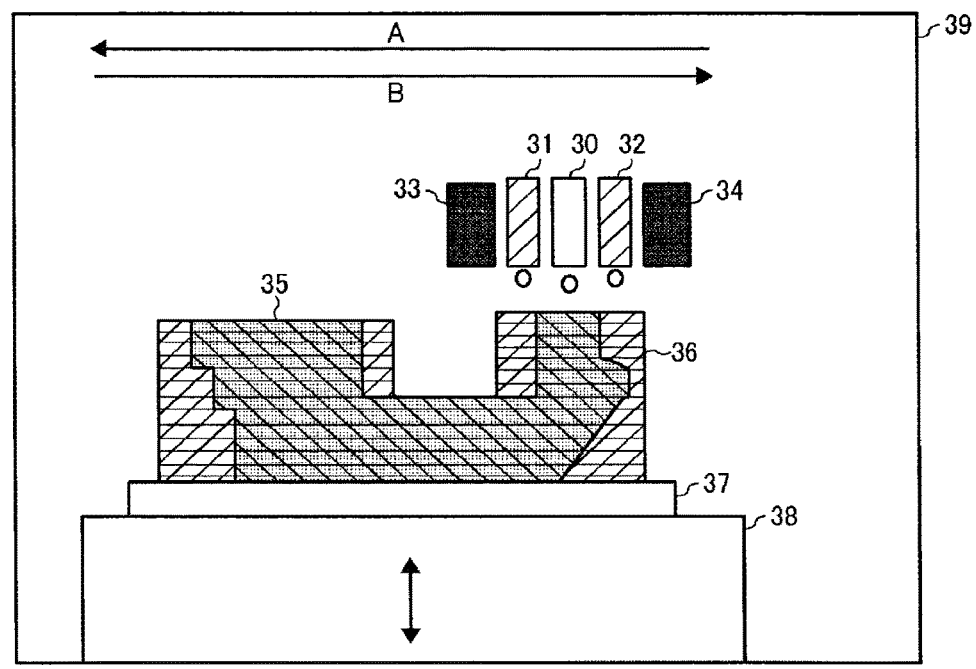
FIG. 2 is a schematic view of an example of another image forming apparatus of the present disclosure.
Figure 3A:
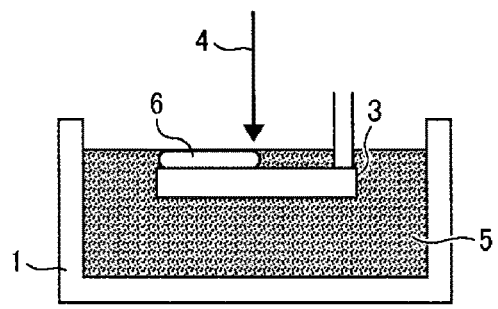
FIG. 3A is a schematic view of an example of still another image forming apparatus of the present disclosure.
Figure 3B:
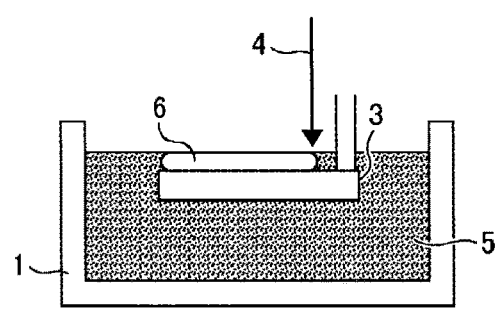
FIG. 3B is a schematic view of an example of still another image forming apparatus of the present disclosure.
Figure 3C:
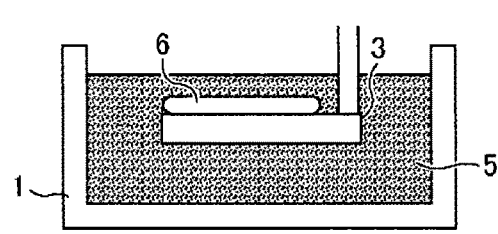
FIG. 3C is a schematic view of an example of still another image forming apparatus of the present disclosure.
Figure 3D:
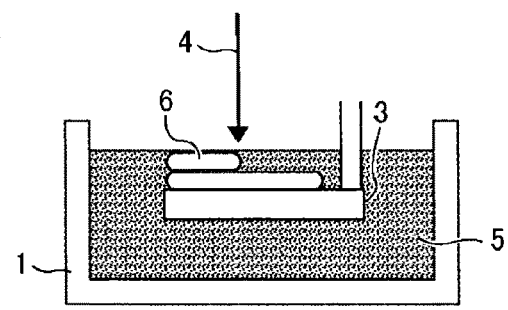
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray. FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d (collectively referred to as "printing units 23") respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.
(Cured Product)

A cured product of the present disclosure is obtained through curing by irradiating the composition of the present disclosure with active energy rays.

It is preferable that the cured product have close adhesiveness of 10 kPa or more to a polypropylene substrate that is not surface-treated.

Examples of the surface treatment include corona discharge surface treatment.
(Laminated Cured Product)

A laminated cured product of the present disclosure includes a first layer and a second layer, where the second layer is disposed on the first layer, the first layer is made of the composition of the present disclosure, and the second layer is made of a composition containing diethylene glycol dimethacrylate.

The composition constituting the second layer contains diethylene glycol dimethacrylate, and further contains other components if necessary.

It is preferable that an average thickness of the first layer be 3 μm or more, an average thickness of the second layer be 10 μm or more, and a ratio of the average thickness of the first layer to the total average thickness of the first layer and the second layer be 15% or more. It is more preferable that the average thickness of the first layer be 5 μm or more, the average thickness of the second layer be 10 μm or more, and the ratio of the average thickness of the first layer to the total average thickness of the first layer and the second layer be 28% or more.

The first layer is preferably formed on a polypropyrene substrate that is not surface-treated.

Examples of the surface treatment include corona discharge surface treatment.

It is preferable that the laminated cured product have close adhesiveness of 10 kPa or more to a polypropyrene substrate, and have higher surface intensity than a polypropyrene substrate that is not coated with the laminated cured product.

EXAMPLES

The present disclosure will be described by way of the following Examples. However, the present disclosure should not be construed as being limited to these Examples.
<Method for Evaluating SI Value>

The SI value was measured by a skin sensitization test by LLNA (Local Lymph Node Assay) method as described below.
[Test Materials]
<<Positive Control Substance>>

α-Hexyl cinnamaldehyde (HCA, available from Wako Pure Chemical Industries, Ltd.) was used as the positive control substance.
<<Medium>>

A mixture liquid obtained by mixing acetone (available from Wako Pure Chemical Industries, Ltd.) and an olive oil (available from Fujimi Pharmaceutical Co., Ltd.) at a volume ratio (acetone:olive oil) of 4:1 was used as the medium.
<<Animals Used>>

Female mice were subjected to eight days of conditioning to each of the test substance, the positive control, and the medium control including six days of quarantine. During the quarantine and conditioning period, nothing unusual was observed in any of the animals.

Based on the body weights of the animals measured two days before sensitization was started, the animals were divided into two groups (4 mice/group) in a manner that the body weight of each individual would be within ±20% of the average body weight of the whole group according to a body weight stratified random sampling method. The ages of the animals when sensitization was started were from 8 to 9 weeks old. Any animals that did not fall into any group by the grouping were excluded from the test.

Throughout the test period, the animals used were identified with an oil-based ink applied to their tails, and their cages were identified with labels.
<<Breading Conditions>>

Throughout the whole breading period including the quarantine and conditioning period, the animals used were breaded in a barriered animal room set to a temperature of from 21° C. to 25° C., a relative humidity of from 40% to 70%, an air change rate of from 10 changes/hour to 15 changes/hour, and a light-dark cycle of 12 hour-intervals (light-on at 7 o'clock, and light-out at 19 o'clock).

The breading cages were cages made of polycarbonate. The number of animals breaded in each cage was 4 mice/cage.

Feeding stuff used was a solid feed for experimental animals named MF (available from Oriental Yeast Co., Ltd.), and was freely fed to the animals used. Drinking water was tap water to which sodium hypochlorite (PURELOX available from Oyalox Co., Ltd.) was added so as to be a chlorine concentration of about 5 ppm, and was freely fed to the animals used through water feed bottles. Animal bedding used was SUNFLAKE (fir tree, power planer shavings, available from Charles River Laboratories Japan, Inc.). The feeding stuff and breading tools were each sterilized in an autoclave (at 121° C. for 30 minutes).

The cages and bedding were replaced at the time of grouping, and on the day of auricular lymph node extraction (when the animals were transferred from the animal room). The water feed bottles and racks were replaced at the time of the grouping.
[Test Method]
<<Group Constitution>>

The group constitution used in measurement test of the SI value is presented in Table 1.

TABLE 1

| Test group | Sensitizing substance | Sensitizing dose (μL/auricle) | Number of times of sensitizing treatment | Number of animals (animal number) |
|---|---|---|---|---|
| Medium control group | Medium only | 25 | Once/day × 3 days | 4 (1-4) |
| Positive control group | 25.0% HCA | 25 | Once/day × 3 days | 4 (5-8) |

[Preparation]
<<Test Substance>>

Weighing conditions for the test substance are presented in Table 2. The test substance was weighed out in a measuring flask, and was fixed to a constant volume of 1 mL by adding a medium to the flask. The prepared liquid was put in a light-blocked airtight container (formed of glass).

TABLE 2

| | Prepared concentration (w/v %) | Amount of test substance weighed out (g) |
|---|---|---|
| Test substance | 50.0 | 0.5 |

<<Positive Control Substance>>

HCA (0.25 g) was accurately weighed out, and was prepared as a 1 mL of 25.0 w/v % liquid by addition of a medium. The prepared liquid was put in a light-blocked airtight container (formed of glass).

<<BrdU>>

In a measuring flask, 200 mg of 5-bromo-2'-deoxyuridine (BrdU, available from Nacalai Tesque, Inc.) was accurately weighed out. Then, a physiological saline (available from Otsuka Pharmaceutical Co., Ltd.) was added thereto, and was subjected to ultrasonic irradiation for dissolving. The resultant solution was fixed to a constant volume of 20 mL to prepare a 10 mg/mL liquid (a BrdU preparation liquid). The preparation liquid was filtered and sterilized through a sterilization filter, and was put in a sterilized container.

<<Preparation Timing and Storage Period>>

The positive control substance preparation liquid was prepared on the day before the sensitization start day, and was stored in a cold place until use. The medium and the test substance preparation liquid were each prepared on the day of sensitization. The BrdU liquid was prepared two days before administration, and was stored in a cold place until the day of administration.

[Sensitization and BrdU Administration]

<<Sensitization>>

The prepared liquids of the test substance and positive control substance and the medium were applied to both auricles of the animals in an amount of 25 µL for each. A micropipetter was used for the application. This operation was performed once a day on three consecutive days.

<<BrdU Administration>>

The BrdU preparation liquid was administered into the abdominal cavity of the animals once about 48 hours after the final sensitization in an amount of 0.5 mL per animal.

[Observation and Tests]

<<Performance Status>>

All animals used for the test were observed more than once a day from the sensitization start day until the auricular lymph node extraction day (i.e., the day when the animals were transferred from the animal room). The observation days were counted in a manner that the sensitization start day was Day 1.

<<Measurement of Body Weight>>

The body weight was measured on the sensitization start day and the auricular lymph node extraction day (i.e., the day when the animals were transferred from the animal room). The average value and standard error of the body weight per group were calculated.

<<Auricular Lymph Node Extraction and Weight Measurement>>

Twenty four hours after the BrdU administration, the animals were euthanized, and the auricular lymph nodes were extracted. Tissues surrounding the auricular lymph nodes were removed. Both auricular lymph nodes were weighed simultaneously. The average value and standard error of the weight of the auricular lymph nodes per group were calculated. After the weight measurement, the auricular lymph nodes were freeze-stored per individual in a biomedical freezer set to −20° C.

<<Measurement of Amount of BrdU Intake>>

After the freeze-stored auricular lymph nodes were returned to room temperature, the auricular lymph nodes were ground by the addition of a physiological saline, and were suspended. The suspension liquid was filtered and then dispensed into a 96-well microplate 3 wells/individual, and the amount of BrdU intake was measured according to the ELISA method. The reagent used was a commercially available kit (CELL PROLIFERATION ELISA, BRDU, COLORIMETRIC, CAT. NO. 1647229 available from Roche Diagnostics gmbh). The optical densities (OD 370 nm to OD 492 nm, an amount of BrdU intake) obtained with a multi-plate reader (FLUOSTAR OPTIMA available from BMG LABTECH Inc.) from the three wells per individual were averaged, and the averaged value was used as a BrdU measurement of each individual.

[Evaluation of Result]

<<Calculation of Stimulation Index (SI)>>

The BrdU measurement of each individual was divided by the averaged value of BrdU measurement of the medium control group, to calculate the SI value of each individual. The SI value of each test group was the averaged value of the SI values of the individuals. The SI values were rounded off at the second decimal place, and expressed to the first decimal place.

$$SI = \frac{\text{Average value of } BrdU \text{ measurement of each individual (average value of 3 wells)}}{\text{Average value of } BrdU \text{ measurement of medium control group (average value of 4 mice)}}$$

Examples 1 to 14 and Comparative Examples 1 to 3

The following materials (A) to (D) were used to prepare an ink according to the common manner. The amounts of these materials (A) to (D) used are presented in the columns of Tables 3-1 to 3-3, where the units of the values are "part(s) by mass".

Figure 4:
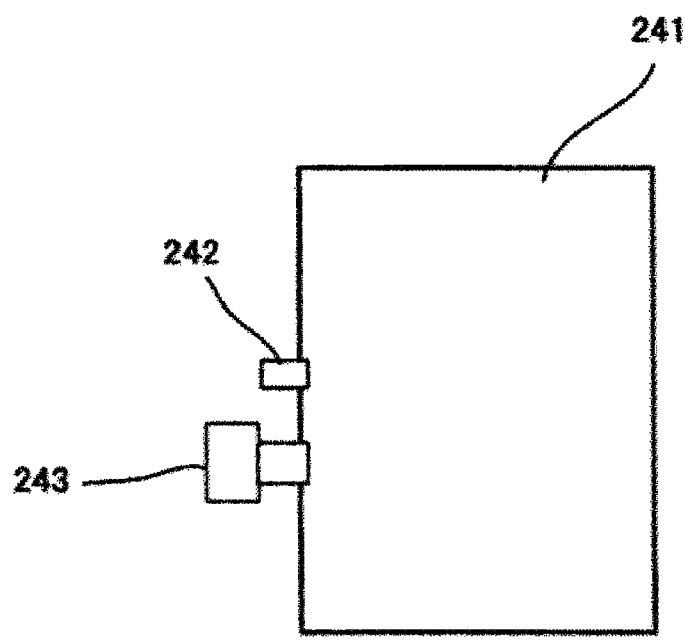
FIG. 4 is a schematic view of an example of a composition bag of a composition stored container.
Figure 5:
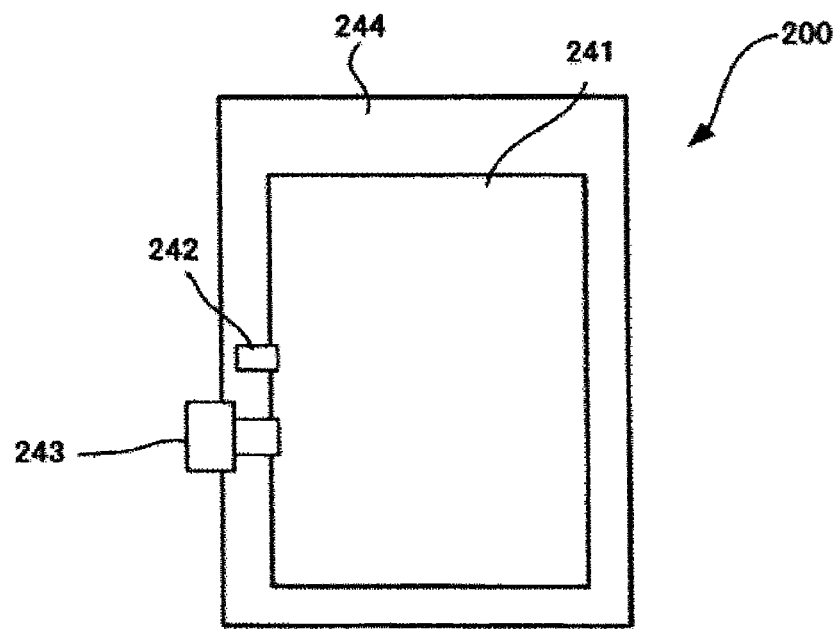
FIG. 5 is a schematic view of an example of a composition stored container containing a composition bag.

(A) Monofunctional (meth)acrylate
(B) Multifunctional (meth)acrylate
(C) Photoradical polymerization initiator negative in skin sensitization
(D) Chlorinated-olefin-structure-containing polymer, and other polymers First, the ink was handled as follows. The ink was filled and sealed in an aluminium pouch bag having a shape illustrated in FIG. 4 so that the ink did not contain bubbles. Then, the sealed pouch bag containing the ink was housed in a plastic cartridge as illustrated in FIG. 5. In a body of a device that can house this cartridge, an ink channel was disposed between the cartridge and GEN4 head (available from Ricoh Printing Systems, Ltd.). The ink was ejected through ink jetting by the ink channel to prepare a solid-coated film having a square of about 3 cm×about 3 cm. Here, an amount of ink droplets ejected was adjusted so that a thickness of the solid-coated film was about 10 µm. In FIGS. 4 and 5, a numerical reference 200 indicates an ink cartridge as a composition stored container, a numerical reference 241 indicates an ink bag as a composition bag, a numerical reference 242 indicates an ink inlet, a numerical reference 243 indicates an ink outlet, and a numerical reference 244 indicates an exterior housing of the cartridge.

The prepared solid coated film was cured at a wavelength that corresponds to the UVA region under the following intensity conditions: 0.2 W/cm² and 3,000 mJ/cm². The cured film was used for evaluation of close adhesiveness.

<Viscosity>

A cone-and-plate rotary viscometer VISCOMETER TVE-22L with a cone rotor (1°34'×R24) (available from Toki Sangyo Co., Ltd) was used to measure the viscosity of each of the prepared inks at 25° C. under the following conditions: number of rotations: 50 rpm, temperature of thermostatic circulating water: 25° C. Here, VISCOMATE VM-150III was used to adjust temperature of the circulating water. Results are presented in Tables 3-1 to 3-3.

Next, each of the inks was evaluated for close adhesiveness between the substrate and the cured coated film Results are presented in Tables 3-1 to 3-3.

<Close Adhesiveness>

Close adhesiveness was evaluated in the following manner. First, the ink was ejected through inkjet on a surface of a film that had been subjected to the corona discharge surface treatment, and on a surface of a film that had not been surface-treated. The film used was a commercially available polypropylene film (available from TOYOBO CO., LTD., P2161, thickness: 60 μm) which is a versatile film material widely used for packing materials and industrial materials. Then, the film was irradiated with light using an UV irradiator LH6 (D valve) (available from Fusion Systems Japan) to cure the ink. The thus-obtained film coated with the ink was evaluated for close adhesiveness based on the following evaluation criteria by the crosscut method according to JIS-K-5600-5-6.

Moreover, a tensile testing machine ("Autograph" AG-10NX plusSC, available from SHIMADZU CORPORATION) was used to measure stress (close adhesiveness) necessary for peeling the coated film of a predetermined area away from the substrate.

[Evaluation Criteria]

A: The coated film was not peeled, or was slightly peeled at a crossing point between two cut lines. The coated film had close adhesiveness of 1 kPa or more.

B: The coated film was not clearly peeled, but had close adhesiveness of less than 1 kPa.

C: The coated film was clearly peeled.

TABLE 3-1

| | | Example | | | | | | | | |
|---|---|---|---|---|---|---|---|---|---|---|
| | | 1 | 2 | 3 | 4 | 5 | 6 | 7 | 8 | 9 |
| A: Monofunctional (meth)acrylate | A1 | 70 | — | — | — | — | — | — | — | — |
| | A2 | — | 70 | 70 | 70 | 70 | — | — | 70 | 80 |
| | A3 | — | — | — | — | — | 70 | — | — | — |
| | A4 | — | — | — | — | — | — | 70 | — | — |
| B. Multifunctional (meth)acrylate | B1 | — | — | — | — | — | — | — | — | 20 |
| | B2 | 30 | 30 | 30 | 30 | 30 | 30 | 30 | 30 | — |
| | B3 | — | — | — | — | — | — | — | — | — |
| | B4 | — | — | — | — | — | — | — | — | — |
| | B5 | — | — | — | — | — | — | — | — | — |
| C: Polymerization initiator | C1 | 10 | 10 | 10 | 10 | 10 | 10 | 10 | — | 10 |
| | C2 | — | — | — | — | — | — | — | 10 | — |
| D: Polymer | D1 | 10 | 10 | 0.05 | — | 1 | 1 | 1 | 1 | 2 |
| | D2 | — | — | — | 0.05 | — | — | — | — | — |
| | D3 | — | — | 10 | 10 | 10 | 10 | 10 | 10 | 15 |
| Carbon Black | | — | — | — | — | — | — | — | 5 | — |
| Viscosity (25° C., mPa · s) | | 9 | 9 | 8 | 8 | 8 | 9 | 10 | 9 | 7 |
| Close adhesiveness to polypropyrene (surface subjected to corona discharge surface treatment) | | A | A | A | A | A | A | A | A | A |
| Close adhesiveness to polypropyrene (non-treated surface) | | A | A | A | A | A | A | A | A | A |

TABLE 3-2

| | | Example | | | | |
|---|---|---|---|---|---|---|
| | | 10 | 11 | 12 | 13 | 14 |
| A: Monofunctional (meth)acrylate | A1 | — | — | — | — | — |
| | A2 | 75 | 70 | 85 | 50 | 20 |
| | A3 | — | — | — | — | 50 |
| | A4 | — | — | — | — | — |
| B: Multifunction (meth)acrylate | B1 | — | — | — | — | — |
| | B2 | — | — | — | 50 | 15 |
| | B3 | 25 | — | — | — | 10 |
| | B4 | — | 30 | — | — | 5 |
| | B5 | — | — | 15 | — | — |
| C: Polymerization initiator | C1 | 10 | 10 | 5 | 15 | 5 |
| | C2 | — | — | — | — | 5 |
| D: Polymer | D1 | 1 | 1 | 2 | 1 | 1 |
| | D2 | — | — | — | — | 0.1 |
| | D3 | 10 | 10 | 15 | 10 | 15 |
| Carbon Black | | — | — | — | — | — |
| Viscosity (25° C., mPa · s) | | 8 | 9 | 11 | 15 | 12 |
| Close adhesiveness to polypropyrene (surface subjected to corona discharge surface treatment) | | A | A | A | A | A |
| Close adhesiveness to polypropyrene (non-treated surface) | | A | A | A | A | A |

TABLE 3-3

| | | Comparative Example | | |
|---|---|---|---|---|
| | | 1 | 2 | 3 |
| A: Monofunctional (meth)acrylate | A1 | 70 | — | — |
| | A2 | — | 70 | — |
| | A3 | — | — | — |
| | A4 | — | — | — |
| B: Multifunctional (meth)acrylate | B1 | — | — | — |
| | B2 | 30 | — | 30 |
| | B3 | — | — | — |
| | B4 | — | — | — |
| | B5 | — | — | — |
| C: Polymerization initiator | C1 | 10 | 10 | 10 |
| | C2 | — | — | — |
| D: Polymer | D1 | — | 10 | 10 |
| | D2 | — | — | — |
| | D3 | 10 | — | — |
| Carbon Black | | — | — | — |
| Viscosity (25° C., mPa · s) | | 8 | 9 | 200 |
| Close adhesiveness to polypropyrene (surface subjected to corona discharge surface treatment) | | A | *2 | *3 |
| Close adhesiveness to polypropyrene (non-treated surface) | | C | *2 | *3 |

*2: The ink was not cured.
*3: Due to high viscosity, the ink could not be ejected.

Details of A1 to A4, B1 to B5, C1 to C2, and D1 to D3 in Tables 3-1 to 3-3 are as follows.

The values in parentheses are SI values measured by LLNA test described in the above (1). In addition, "negative" and "nothing" respectively mean "being negative in skin sensitization" and "having no skin sensitization". Each of the "being negative in skin sensitization" and the "having no skin sensitization" is determined according to the MSDS (Material Safety Data Sheet) described in the (2), or the reference described in the (3). Moreover, "positive" means the remark "R43" that presents "being problematic in skin sensitization" in EU directive Risk Phrases; or the remarks "H317" that presents "being problematic in skin sensitization" in the Regulation on CLP. Here, the polymer components have high molecular weight, and have difficulty in passing through skin. Therefore, the polymer components typically have no skin sensitization.

—(A) Monofunctional (Meth)Acrylate—
- A1: t-Butyl acrylate, "t-butyl acrylate" (positive), available from Osaka Organic Chemical Industry Ltd.
- A2: t-butyl methacrylate, "ACRYESTER TB", available from MITSUBISHI RAYON CO., LTD., (negative) which was evaluated according to the reference (test method: maximization method)
- A3: n-Pentyl methacrylate, "n-AmylMethacrylate", available from Zhangjiagang Render Chemical, (negative) which was evaluated according to the reference (test method: maximization method)
- A4: n-Hexyl methacrylate, "n-Hexyl Methacrylate", available from Tokyo Chemical Industry Co., Ltd., (negative) which was evaluated according to the reference (test method: maximization method)

—(B) Multifunctional (Meth)Acrylate—
- B1: Ethyleneoxide-modified trimethylolpropane triacrylate, "A-TMPT-3EO" (positive), available from Shin Nakamura Chemical Co., Ltd.
- B2: Glycerol dimethacrylate, "701" (1.2), available from Shin Nakamura Chemical Co., Ltd.
- B3: Tricyclodecane dimethanol diacrylate, "DCP" (1.3), available from Shin Nakamura Chemical Co., Ltd.
- B4: Ethyleneoxide-modified trimethylolpropane trimethacrylate, "TMPT-3EO" (1.0), available from Shin Nakamura Chemical Co., Ltd.
- B5: Caprolactone-modified dipentaerythritolhexaacrylate, available from Nippon Kayaku Co., Ltd., (negative) which was evaluated according to the MSDS (test method: OECD Test Guideline 406)

—(C) Radical Polymerization Initiator Negative in Skin Sensitization—
- C1: 1-Hydroxy-cyclohexyl phenyl ketone, "IRGACURE 184", available from BASF (nothing) which was evaluated according to the MSDS (test method: OECD Test Guideline 406)
- C2: 2-Dimethylamino-2-(4-methylbenzyl)-1-(4-morpholin-4-yl-phenyl)butan-1-one, "IRGACURE 379", available from BASF (nothing) which was evaluated according to the MSDS (test method: OECD Test Guideline 406)

—(D) Chlorinated-Olefin-Structure-Containing Polymer, and Other Polymers—
- D1: Chlorinated-olefin-structure-containing polymer, "HARDLEN DX530P" (weight average molecular weight: 100,000 and rate of chlorination: 30%), available from TOYOBO CO., LTD.
- D2: Chlorinated-olefin-structure-containing polymer, "HARDLEN 14-WL-P" (weight average molecular weight: 40,000 and rate of chlorination: 27%), available from TOYOBO CO., LTD.
- D3: styrene-(meth)acrylic acid-α-methylstyrene copolymer, "JONCRYL 611" (acid value: 53 mg KOH/g and weight average molecular weight: 8,100), available from BASF —Carbon Black—

An amount of carbon black presented in Tables 3-1 to 3-3 is an amount of a mixture containing a polymeric dispersant (SOLSPERSE 39000, available from The Lubrizol Corporation) and carbon black #10 (available from Mitsubishi Chemical Corporation) at a ratio of 3:1 (polymeric dispersant: carbon black #10).

From the results of Tables 3-1 and 3-2, it is found that all of the inks of Examples 1 to 14 have a viscosity of in a range of from 5 mPa·s to 18 mPa·s at 25° C.

Comparison between Example 1 and Comparative Example 1 indicates that when the ink contains the chlorinated-olefin-structure-containing polymer as a polymer component of group D, the ink can attain close adhesiveness to the polypropyrene substrate that is not surface-treated.

As is clear from Comparative Example 2, the ink containing no multifunctional (meth)acrylate is poor in curing ability.

As is clear from Comparative Example 3, the ink containing no monofunctional (meth)acrylate has high viscosity, and does not perform printing through inkjet.

From the results of Examples 1 and 2, it is found that when the monofunctional (meth)acrylate of group A contains the compound that is not problematic in skin sensitization, the ink can attain close adhesiveness to a polypropylene substrate that is not surface-treated. Therefore, in order to safely use the ink, use of the compound that is not problematic in skin sensitization is desirably used for the ink.

From the results of Examples 2 to 4, it is found that even if the ink contains the chlorinated-olefin-structure-containing polymer alone or a slight amount of the chlorinated-olefin-structure-containing polymer in combination with another polymer component, all of the inks can attain close adhesiveness to a polypropylene substrate that is not surface-treated. Among them, it is found that when the inks containing a slight amount of the chlorinated-olefin-structure-containing polymer in combination with another polymer component, ink droplets elongated during inkjet ejection, and a rather large amount of mist was generated. Therefore, the ink preferably contains a slight amount of the polymer component having a large molecular weight.

From Examples 3 and 4, it is found that even if the ink contains different kinds of the chlorinated-olefin-structure-containing polymers, the ink can attain close adhesiveness to a polypropylene substrate that is not surface-treated. Therefore, optimum chlorinated-olefin-structure-containing polymers may be selected depending on the intended purpose.

From the results of Examples 5, 6, and 7, it is found that when the monofunctional (meth)acrylate of group A is mixed with a different kind of the multifunctional (meth)acrylate that is not problematic in skin sensitization, all of the inks of Examples 5, 6, and 7 can attain close adhesiveness to a polypropylene substrate that is not surface-treated.

As is clear from Example 8, it is found that even if the ink contains the colorant, the ink can attain close adhesiveness to a polypropylene substrate that is not surface-treated.

From the results of Examples 9, 10, 11, and 12, it is found that when the inks each contain a different kind of the multifunctional (meth)acrylate, all of the inks can attain close adhesiveness to a polypropylene substrate that is not surface-treated. Therefore, in order to safely use the ink, use of the compound that is not problematic in skin sensitization is desirably used for the ink.

From the result of Example 14, it is found that even if two or more materials of each of the groups are used in the ink, the ink can attain close adhesiveness to a polypropylene substrate that is not surface-treated. Therefore, optimum materials may be used depending on the intended purpose.

All of the aforementioned inks of Examples are not sticky based on confirmation through touch with a finger, and are favorably cured.

Examples 15 to 31, and Comparative Examples 4 to 8

Preparation of Laminated Cured Product

As presented in Tables 4-1 to 4-4, the following inks (A) to (C), each containing no chlorinated polyolefin, were used for the ink for forming first layer (bottom layer) in Examples, and inks, each of which does not contain the chlorinated polyolefin, were used for the ink for forming first layer (bottom layer) in Comparative Examples. In addition, ink (E) was used for the ink for forming second layer (upper layer) in both Examples and Comparative Examples.

First, the ink was handled as follows. The ink was filled and sealed in an aluminium pouch bag so that the ink would not contain bubbles. Then, the sealed pouch bag containing the ink was housed in a plastic cartridge. In a body of a device that can house this cartridge, an ink channel was disposed between the cartridge and GEN4 head (available from Ricoh Printing Systems, Ltd.). The ink was ejected through ink jetting using the ink channel to prepare a solid-coated film. Here, a temperature of the head and a voltage for jetting the ink were adjusted so that a jetting speed of the ink droplets was 7 m/s. An amount of ink droplets jetted was adjusted so that a thickness of the coated film of the solid image was about 10 μm.

Note that, the values in parentheses are SI values measured by LLNA test described in the above (1). In addition, "negative" and "nothing" respectively mean "being negative in skin sensitization" and "having no skin sensitization". Each of the "being negative in skin sensitization" and the "having no skin sensitization" is determined according to the MSDS (Material Safety Data Sheet) described in the (2), or the reference described in the (3). Here, the polymer components have high molecular weight, and have difficulty in passing through skin. Therefore, the polymer components typically have no skin sensitization.

<Ink for Forming First Layer (Bottom Layer)>

| -Ink (A)- | |
|---|---|
| t-Butyl acrylate, "t-butyl acrylate", available from Osaka Organic Chemical Industry Ltd. (H317, judged as "positive in skin sensitization" according to GIS classification criteria): | 60 parts by mass |
| Glycerol dimethacrylate, "701", available from Shin Nakamura Chemical Co., Ltd. (1.2): | 30 parts by mass |
| Styrene-acryl copolymer resin, "JONCRYL 611", available from BASF (acid value: 53 mg KOH/g, weight average molecular weight: 8,100): | 10 parts by mass |
| Chlorinated polyolefin, "HARDLEN DX-530P", available from TOYOBO CO., LTD. (weight average molecular weight: 100,000): | 1 part by mass |
| 2-Dimethylamino-2-(4-methylbenzyl)-1-(4-morpholin-4-yl-phenyl)butan-1-one, | 10 parts by mass |

| -Ink (A)- | |
|---|---|
| "IRGACURE 379", available from BASF, (nothing) which was evaluated according to the MSDS (test method: OECD Test Guideline 406): | |

A viscosity of the ink (A) at 25° C. was measured in the same manner as in Example 1, and was 9 mPa·s.

| -Ink (B)- | |
|---|---|
| t-Butyl methacrylate, "ACRYESTER TB", available from MITSUBISHI RAYON CO., LTD., (negative) which was evaluated according to the reference (test method: maximization method): | 65 parts by mass |
| Tricylodecane dimethanol diacrylate, "DCP", available from Shin Nakamura Chemical Co., Ltd. (1.3): | 30 parts by mass |
| Styrene-acryl copolymer resin, "JONCRYL 611" available from BASF (acid value: 53 mg KOH/g, weight average molecular weight: 8,100): | 10 parts by mass |
| Chlorinated polyolefin, "HARDLEN DX-530P", available from TOYOBO CO., LTD. (weight average molecular weight: 100,000): | 1 part by mass |
| 2-Dimethylamino-2-(4-methylbenzyl)-1-(4-morpholin-4-yl-phenyl)butan-1-one, "IRGACURE 379", available from BASF (nothing) which was evaluated according to the MSDS (test method: OECD Test Guideline 406): | 10 parts by mass |

A viscosity of the ink (B) at 25° C. was measured in the same manner as in Example 1, and was 10 mPa·s.

| -Ink (C)- | |
|---|---|
| n-Pentyl methacrylate, "n-AmylMethacrylate", available from Zhangjiagang Render Chemical, (negative) which was evaluated according to the reference (test method: maximization method): | 60 parts by mass |
| Diethylene glycol dimethacrylate, "2G", available from Shin Nakamura Chemical Co., Ltd., (1.1): | 15 parts by mass |
| Ethyleneoxide-modified trimethylolpropane trimethacrylate, "TMPT-3EO", available from Shin Nakamura Chemical Co., Ltd., (1.0): | 15 parts by mass |
| Styrene-acryl copolymer resin, "JONCRYL 611", available from BASF (acid value: 53 mg KOH/g, weight average molecular weight: 8,100): | 10 parts by mass |
| Chlorinated polyolefin, "HARDLEN 14-WL-P", available from TOYOBO CO., LTD. (weight average molecular weight: 40,000): | 1 part by mass |
| 2-Dimethylamino-2-(4-methylbenzyl)-1-(4-morpholin-4-yl-phenyl)butan-1-one, "IRGACURE 379", available from BASF (nothing) which was evaluated according to the MSDS (test method: OECD Test Guideline 406): | 10 parts by mass |

A viscosity of the ink (C) at 25° C. was measured in the same manner as in Example 1, and was 9 mPa·s.

-Ink (D)-

| | |
|---|---|
| t-Butyl methacrylate, "ACRYESTER TB", available from MITSUBISHI RAYON CO., LTD., (negative) which was evaluated according to the reference (test method: maximization method): | 65 parts by mass |
| Tricylodecane dimethanol diacrylate, "DCP", available from Shin Nakamura Chemical Co., Ltd., (1.3): | 30 parts by mass |
| Styrene-acryl copolymer resin, "JONCRYL 611", available from BASF, (acid value: 53 mg KOH/g, weight average molecular weight: 8,100): | 10 parts by mass |
| 2-Dimethylamino-2-(4-methylbenzyl)-1-(4-morpholin-4-yl-phenyl)butan-1-one, "IRGACURE 379", available from BASF, (nothing) which was evaluated according to the MSDS (test method: OECD Test Guideline 406): | 10 parts by mass |

A viscosity of the ink (D) at 25° C. was measured in the same manner as in Example 1, and was 10 mPa·s.

<Ink for Forming Second Layer (Upper Layer)>

-Ink (E)-

| | |
|---|---|
| Diethylene glycol dimethacrylate, "2G", available from Shin Nakamura Chemical Co., Ltd., (1.1): | 70 parts by mass |
| Caprolactone-modified dipentaerythritolhexaacrylate, "DPCA 60", available from Nippon Kayaku Co., Ltd., (negative) which was evaluated according to the MSDS: | 30 parts by mass |
| 1-Hydroxy-cyclohexyl phenyl ketone, "IRGACURE 184", available from BASF, (nothing) which was evaluated according to the MSDS (test method: OECD Test Guideline 406): | 15 parts by mass |
| Polyether-modified polydimethylsiloxane, "BYKUV 3510", available from BYK (siloxane compounds are components described in "Guidelines for Labelling Cosmetics by Japan Cosmetic Industry Association" as cosmetic compounds, and are sufficiently lower in skin sensitization compared with various materials that are typically used for photopolymerizable compounds.): | 0.3 parts by mass |

A viscosity of the ink (E) at 25° C. was measured in the same manner as in Example 1, and was 28 mPa·s.

<Close Adhesiveness>

Close adhesiveness was evaluated in the following manner. First, the ink was ejected through inkjet on a surface of a film that is not surface-treated. The film used is a commercially available polypropylene film (available from TOYOBO CO., LTD., P2161, thickness: 60 μm) which is a versatile film material widely used for packing materials and industrial materials. Then, each of the layers was irradiated with light using an UV irradiator LH6 (available from Fusion Systems Japan) at 3 J/cm$^2$ in the UVA region to cure the ink. The thus-obtained laminated coated film was measured for close adhesiveness through the pull-off method according to JIS-K-5600-5-7 (cutting was not performed on the peripheral portions of the coated film attached to the jig), and through a tensile testing machine ("Autograph" AG-10NX PLUSSC, available from SHIMADZU CORPORATION), and was evaluated based on the following criteria. Here, close adhesiveness evaluated as "A" or "B" is judged as a practically usable level.

[Evaluation Criteria]

A: Close adhesiveness was 100 kPa or more.

B: Close adhesiveness was 50 kPa or more but less than 100 kPa.

C: Close adhesiveness was 10 kPa or more but less than 50 kPa.

D: Close adhesiveness was less than 10 kPa.

Note that, close adhesiveness of less than 10 kPa corresponds to a degree in which the coated film is completely peeled off according to the crosscut method of JIS-K-5600-5-6.

<Hardness>

An inkjet ejecting device including a GEN4 head (available from Ricoh Printing Systems, Ltd.) was used to eject each of the obtained active-energy-ray-curable compositions (active-energy-ray-curable inks) on a polycarbonate film (product name: IUPILON 100FE2000, available from Mitsubishi Engineering-Plastics Corporation, average thickness: 100 μm) so that an average thickness of the coated films is 10 μm. Immediately after ejection, the composition was irradiated with ultraviolet rays at an exposure dose of 1,500 mJ/cm$^2$ by an UV irradiator (product name: LH6, available from Fusion Systems Japan) to obtain a cured product. The obtained cured product was measured for pencil hardness according to scratch hardness (the pencil test) described in JIS K5600-5-4, and was evaluated for "hardness" based on the following criteria. Here, the hardness evaluated as "A" or "B" is judged as a practically usable level.

Here, the pencil hardness was evaluated under the high temperature and high humidity environment (40° C., 80% RH) and under the low temperature and low humidity environment (10° C., 15% RH). A softer pencil hardness of the two pencil hardnesses evaluated under the aforementioned conditions was judged as pencil hardness. For example, in cases where the pencil hardness was judged as "B" under the high temperature and high humidity environment (40° C., 80% RH), whereas the pencil hardness was judged as "H" under the low temperature and low humidity environment (10° C., 15% RH), the pencil hardness was judged as "B". The used device and tools are described below. An electronic micrometer (available from ANRITSU CORPORATION) was used to measure the average thickness. The average thickness is an average value of the thickness values measured at roundly-selected ten positions.

—Device and Tools—

Device: TQC WW tester for scratch pencil hardness (available from COTEC CORPORATION) (for load of 750 g only)

Pencils: A set of wooden drawing pencils having the following hardnesses (available from UNI Mitsubishi Pencil Co., Ltd.): 6B, 5B, 4B, 3B, 2B, B, HB, F, H, 2H, 3H, 4H, 5H, and 6H Pencil sharpener: A special pencil sharpener that removes only the wooden part so as to retain a cylindrical pencil lead as it is.

Abrasive paper: 3M-P1000 (available from 3M Japan Limited)

[Evaluation Criteria]

A: The pencil hardness is H or harder.

B: The pencil hardness is F or HB.

C: The pencil hardness is B or softer.

TABLE 4-1

| | First layer (bottom layer) Ink (A) Average thickness: X (μm) | Second layer (upper layer) Ink (E) Average thickness: Y (μm) | Total thickness (μm) | [X/(X + Y)] × 100 (%) | Close adhesiveness | Hardness |
|---|---|---|---|---|---|---|
| Example 15 | 5 | 10 | 15 | 33.3 | A | A |
| Example 16 | 8 | 15 | 23 | 34.7 | A | A |
| Example 17 | 8 | 20 | 28 | 28.6 | A | A |
| Example 18 | 13 | 25 | 38 | 34.2 | A | A |
| Example 19 | 3 | 15 | 18 | 16.7 | B | A |
| Example 20 | 3 | 20 | 23 | 13 | C | A |
| Example 21 | 5 | 5 | 10 | 50 | B | B |
| Comparative Example 4 | The first layer was not coated. | The second layer was not coated. | — | — | — | C |

TABLE 4-2

| | First layer (bottom layer) Ink (B) Average thickness: X (μm) | Second layer (upper layer) Ink (E) Average thickness: Y (μm) | Total thickness (μm) | [X/(X + Y)] × 100 (%) | Close adhesiveness | Hardness |
|---|---|---|---|---|---|---|
| Example 22 | 5 | 10 | 15 | 33.3 | A | A |
| Example 23 | 8 | 15 | 23 | 34.7 | A | A |
| Example 24 | 8 | 20 | 28 | 28.6 | A | A |
| Example 25 | 13 | 25 | 38 | 34.2 | A | A |
| Example 26 | 3 | 15 | 18 | 16.7 | B | A |

TABLE 4-3

| | First layer (bottom layer) Ink (C) Average thickness: X (μm) | Second layer (upper layer) Ink (E) Average thickness: Y (μm) | Total thickness (μm) | [X/(X + Y)] × 100 (%) | Close adhesiveness | Hardness |
|---|---|---|---|---|---|---|
| Example 27 | 5 | 10 | 15 | 33.3 | A | A |
| Example 28 | 8 | 15 | 23 | 34.7 | A | A |
| Example 29 | 8 | 20 | 28 | 28.6 | A | A |
| Example 30 | 13 | 25 | 38 | 34.2 | A | A |
| Example 31 | 3 | 15 | 18 | 16.7 | B | A |

TABLE 4-4

| | First layer (bottom layer) Ink (D) Average thickness: X (μm) | Second layer (upper layer) Ink (E) Average thickness: Y (μm) | Total thickness (μm) | [X/(X + Y)] × 100 (%) | Close adhesiveness | Hardness |
|---|---|---|---|---|---|---|
| Comparative Example 5 | 5 | 10 | 15 | 33.3 | D | The ink could not be evaluated due to poor close |
| Comparative Example 6 | 5 | 15 | 23 | 34.7 | D | |

TABLE 4-4-continued

|  | First layer (bottom layer) Ink (D) Average thickness: X (μm) | Second layer (upper layer) Ink (E) Average thickness: Y (μm) | Total thickness (μm) | [X/(X + Y)] × 100 (%) | Close adhesiveness | Hardness |
|---|---|---|---|---|---|---|
| Comparative Example 7 | 8 | 20 | 28 | 28.6 | D | adhesiveness |
| Comparative Example 8 | 13 | 25 | 38 | 34.2 | D | |

From the results of Examples 15 to 31, it is found that the active-energy-ray-curable composition has close adhesiveness of 10 kPa or more and exhibits higher hardness than a polypropyrene substrate, when an average thickness of the first layer (bottom layer) is 3 μm or more, an average thickness of the second layer (upper layer) is 10 μm or more, and a ratio of the average thickness of the first layer to the total average thickness of the first layer and the second layer is 15% or more.

In addition, it is found that the active-energy-ray-curable composition is more excellent in close adhesiveness, when the average thickness of the first layer (bottom layer) is 5 μm or more, the average thickness of the second layer (upper layer) is 10 μm or more, and a ratio of the average thickness of the first layer to the total average thickness of the first layer and the second layer is 28% or more.

As is clear from Comparative Examples 4 to 8, it is found that when the chlorinated polyolefin is not contained in the ink of the first layer (bottom layer), the ink cannot attain high close adhesiveness.

Note that, all of the formed laminated cured products of Examples and Comparative Examples are not sticky based on the confirmation through touch, and are favorably cured.

The opposite surface of the substrate was subjected to surface treatment. This surface has higher close adhesiveness in all of the Examples (not presented in Tables).

Aspects of the present disclosure are as follows.
<1> An active-energy-ray-curable composition including:
at least one monofunctional (meth)acrylate;
at least one multifunctional (meth)acrylate; and
at least one chlorinated-olefin-structure-containing polymer.
<2> The active-energy-ray-curable composition according to <1>,
wherein a weight average molecular weight of the chlorinated-olefin-structure-containing polymer is 100,000 or less.
<3> The active-energy-ray-curable composition according to <1> or <2>,
wherein an amount of the chlorinated-olefin-structure-containing polymer is 0.05 parts by mass or more but 10 parts by mass or less relative to 100 parts by mass of total monomer components.
<4> The active-energy-ray-curable composition according to any one of <1> to <3>,
wherein the at least one monofunctional (meth)acrylate and the at least one multifunctional (meth)acrylate are negative in skin sensitization.
<5> The active-energy-ray-curable composition according to <4>,
wherein the at least one monofunctional (meth)acrylate has Stimulation Index (SI value) of less than 3, where the Stimulation Index indicates a degree of skin sensitization measured by a skin sensitization test (LLNA method) of the monofunctional (meth)acrylate.
<6> The active-energy-ray-curable composition according to <4>,
wherein the multifunctional (meth)acrylate has Stimulation Index (SI value) of less than 3, where the Stimulation Index indicates a degree of skin sensitization measured by a skin sensitization test (LLNA method) of the multifunctional (meth)acrylate.
<7> The active-energy-ray-curable composition according to any one of <1> to <6>,
wherein an amount of the monofunctional (meth)acrylate is 50 parts by mass or more but 85 parts by mass or less relative to 100 parts by mass of total monomer components.
<8> The active-energy-ray-curable composition according to any one of <1> to <7>,
wherein an amount of the multifunctional (meth)acrylate is 15 parts by mass or more but 50 parts by mass or less relative to 100 parts by mass of total monomer components.
<9> An active-energy-ray-curable ink composition including
the active-energy-ray-curable composition according to any one of <1> to <8>.
<10> The composition according to any one of <1> to <9>,
wherein a viscosity of the composition at 25° C. is 5 mPa·s or more but 18 mPa·s or less.
<11> A composition stored container including:
the composition according to any one of <1> to <10>; and
a container storing the composition.
<12> A two-dimensional or three-dimensional image forming apparatus including:
a storing part storing the composition according to any one of <1> to <10>; and
an irradiating unit configured to irradiate the composition with active energy rays.
<13> A method for forming a two-dimensional or three-dimensional image, the method including
irradiating the composition according to any one of <1> to <10> with active energy rays.
<14> The method for forming a two-dimensional or three-dimensional image according to <13>,
wherein the image is formed on a polypropyrene substrate that is not surface-treated.
<15> A cured product, which is obtained through curing by irradiating the composition according to any one of <1> to <10> with active energy rays.
<16> The cured product according to <15>,
wherein the cured product has close adhesiveness of 1 kPa or more to the polypropyrene substrate that is not surface-treated.

<17> A laminated cured product including:
a first layer; and
a second layer,
the second layer being disposed on the first layer,
wherein the first layer is made of the composition according to any one of <1> to <10>, and the second layer is made of a composition containing diethylene glycol dimethacrylate.
<18> The laminated cured product according to <17>,
wherein an average thickness of the first layer is 3 μm or more, an average thickness of the second layer is 10 μm or more, and a ratio of the average thickness of the first layer to a total average thickness of the first layer and the second layer is 15% or more.
<19> The laminated cured product according to <17> or <18>,
wherein the laminated cured product is formed on a polypropyrene substrate that is not surface-treated.
<20> The laminated cured product according to any one of <17> to <19>,
wherein the laminated cured product has close adhesiveness of 10 kPa or more to a polypropyrene substrate that is coated with the laminated cured product, and the laminated cured product has higher surface intensity than a polypropyrene substrate that is not coated with the laminated cured product.
<21> A decorative product including:
a polypropyrene substrate; and
the cured product according to any one of <15> to <20>,
a surface of the polypropyrene substrate being decorated with the cured product.

The active-energy-ray-curable composition according to any one of <1> to <8>, the active-energy-ray-curable ink composition according to <9>, the composition according to <10>, the composition stored container according to <11>, the two-dimensional or three-dimensional image forming apparatus according to <12>, the method for forming a two-dimensional or three-dimensional image according to <13> or <14>, the cured product according to <15> or <16>, the laminated cured product according to any one of <17> to <20>, and the decorative product according to <21> can solve the existing problems, and can achieve the object of the present disclosure.

What is claimed is:

1. An active-energy-ray-curable composition comprising:
   at least one monofunctional (meth)acrylate selected from the group consisting of t-butyl acrylate, t-butyl methacrylate, n-pentyl methacrylate, and n-hexyl methacrylate;
   at least one multifunctional (meth)acrylate selected from the group consisting of ethyleneoxide-modified trimethylolpropane trimethacrylate, ethyleneoxide-modified trimethylolpropane triacrylate, caprolactone-modified dipentaerythritolhexaacrylate, and tricyclodecane dimethanol diacrylate;
   at least one chlorinated-olefin-structure-containing polymer having a weight average molecular weight of 40,000 or less; and
   at least one polymerization initiator,
   wherein the at least one monofunctional (meth)acrylate is included in an amount of from 50 to 85 parts by mass, the at least one multifunctional (meth)acrylate is included in an amount of from 15 to 50 parts by mass, and the at least one chlorinated-olefin-structure-containing polymer is included in an amount of from 0.05 to 10 parts by mass, relative to 100 parts by mass of total monomer components,
   the at least one multifunctional (meth)acrylate does not comprise glycerol dimethacrylate, and
   the at least one polymerization initiator is included in an amount of from 8.26 to 8.3 wt % based on 100 wt % of the active-energy-ray-curable composition.

2. The active-energy-ray-curable composition according to claim 1,
   wherein the at least one chlorinated-olefin-structure-containing polymer has a rate of chlorination of 10% by mass to 50% by mass.

3. A composition stored container comprising:
   the active-energy-ray-curable composition according to claim 1; and
   a container storing the active-energy-ray-curable composition.

4. A two-dimensional or three-dimensional image forming apparatus comprising:
   a storing part storing the active-energy-ray-curable composition of claim 1; and
   an irradiating unit configured to irradiate the active-energy-ray-curable composition with active energy rays.

5. A method for forming a two-dimensional or three-dimensional image, the method comprising
   irradiating the active-energy-ray-curable composition according to claim 1 with active energy rays.

6. The method for forming a two-dimensional or three-dimensional image according to claim 5,
   wherein the two-dimensional or three-dimensional image is formed on a polypropyrene substrate that is not surface-treated.

7. A cured product, which is obtained by irradiating the active-energy-ray-curable composition according to claim 1 with active energy rays to cure the active-energy-ray-curable composition.

8. The cured product according to claim 7,
   wherein the cured product has close adhesiveness of 1 kPa or more to a polypropyrene substrate that is not surface-treated.

9. A laminated cured product comprising:
   a first layer; and
   a second layer disposed on the first layer,
   wherein the first layer is made of the active-energy-ray-curable composition of claim 1, and the second layer is made of a composition comprising diethylene glycol dimethacrylate.

10. The laminated cured product according to claim 9,
    wherein an average thickness of the first layer is 3 μm or more, an average thickness of the second layer is 10 μm or more, and a ratio of the average thickness of the first layer to a total average thickness of the first layer and the second layer is 15% or more.

11. The laminated cured product according to claim 9,
    wherein the laminated cured product is formed on a polypropyrene substrate that is not surface-treated.

12. The laminated cured product according to claim 9,
    wherein the laminated cured product has close adhesiveness of 10 kPa or more to a polypropyrene substrate, and the laminated cured product has higher surface intensity than a polypropyrene substrate that is not coated with the laminated cured product.

13. A method for forming a laminated cured product, the method comprising:
    applying the active-energy-ray-curable composition of claim 1 onto a substrate;
    irradiating the active-energy-ray-curable composition with active energy rays such that the active-energy-ray-curable composition is cured and a first layer is formed on the substrate; and applying a composition comprising diethylene glycol dimethacrylate on the first layer such that a second layer disposed on the first layer is formed,
wherein the substrate is a polypropyrene substrate that is not surface-treated.

14. The method according to claim 13,
wherein an average thickness of the first layer is 5 µm to 13 µm, an average thickness of the second layer is 10 µm to 25 µm, and a ratio of the average thickness of the first layer to a total average thickness of the first layer and the second layer is 28.6% to 34.7%.

15. An active-energy-ray-curable composition comprising:
at least one monofunctional (meth)acrylate;
at least one multifunctional (meth)acrylate;
at least one chlorinated-olefin-structure-containing polymer having a weight average molecular weight of 40,000 or less; and
at least one polymerization initiator,
wherein the at least one polymerization initiator is included in an amount of from 5 to 10 parts by mass, relative to 100 parts by mass of total monomer components, and in an amount of from 8.26 to 8.3 wt % based on 100 wt % of the active-energy-ray-curable composition, and
the active-energy-ray-curable composition does not comprise glycerol dimethacrylate.

16. The active-energy-ray-curable composition according to claim 15,
wherein the at least one monofunctional (meth)acrylate and the at least one multifunctional (meth)acrylate are negative in skin sensitization.

17. The active-energy-ray-curable composition according to claim 16,
wherein the at least one monofunctional (meth)acrylate, the at least one multifunctional (meth)acrylate, or both, has a Stimulation Index (SI value) of less than 3, where the Stimulation Index indicates a degree of skin sensitization measured by a skin sensitization test (LLNA method) on the at least one monofunctional (meth) acrylate, the at least one multifunctional (meth)acrylate, or both.

18. The active-energy-ray-curable composition according to claim 15,
wherein the at least one chlorinated-olefin-structure-containing polymer has a chlorination rate of from 10% by mass to 50% by mass.

19. An active-energy-ray-curable ink composition comprising
the active-energy-ray-curable composition according to claim 1.

20. The active-energy-ray-curable ink composition according to claim 19,
wherein a viscosity of the active-energy-ray-curable ink composition at 25° C. is 5 mPa·s or more but 18 mPa·s or less.

21. The active-energy-ray-curable ink composition according to claim 19, consisting of:
the at least one monofunctional (meth)acrylate;
the at least one multifunctional (meth)acrylate;
the at least one chlorinated-olefin-structure-containing polymer;
the at least one polymerization initiator;
optionally at least one organic solvent; and
optionally at least one other component selected from the group consisting of surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters (regulators), and thickeners.

* * * * *